United States Patent Office 3,666,447
Patented May 30, 1972

3,666,447
REMOVAL AND RECOVERY OF COPPER FROM SUBSTANTIALLY CYANIDE-FREE ALKALINE WASTE SOLUTIONS
Edward B. Saubestre, Hamden, Conn., assignor to Enthone, Incorporated, New Haven, Conn.
No Drawing. Filed Mar. 25, 1970, Ser. No. 22,679
Int. Cl. C22b *15/12*
U.S. Cl. 75—108                     1 Claim

ABSTRACT OF THE DISCLOSURE

Process for the removal of substantially all copper from a substantially cyanide-free alkaline waste solution containing ionic copper, a reducing agent, for example formaldehyde, for the ionic copper which is added to the solution if not already present therein, and usually a complexing agent for the ionic copper. The process also provides for the recovery of marketable zero valent metallic copper. The alkaline waste solution is contacted with a material or metal catalytic to the reduction of the ionic copper by the reducing agent to zero valent metallic copper, and the catalytic contacting continued until the desired amount of copper is precipitated as zero valent metallic copper. The metallic copper precipitate is then separated, for instance by filtration, from the solution. Exemplary of the catalytic metals for use in catalyzing the reduction of the ionic copper to zero valent metallic copper are palladium, platinum, gold and silver.

BACKGROUND OF THE INVENTION

(1) Field of the invention

This invention relates to removal of copper from waste solutions and more particularly to a process for the removal and recovery of copper from substantially cyanide-free alkaline waste solutions.

(2) Description of the prior art

Waste or spent alkaline copper-containing solutions, for instance chemical reduction alkaline copper plating waste solutions or baths, are usually discarded into sewers, rivers of chemical reduction copper plating alkaline spent solutions which may be 1 gram per liter or higher in the case of chemical reduction copper plating alkalie spent solutions and of a considerably higher copper content in the case of chemical reduction copper plating solutions that have "seeded out" shortly after preparation or use, a serious problem exists in the discarding of the waste solutions inasmuch as the copper content is lethal to certain aquatic fauna and flora. It is reported that as little as 2 p.p.m. of copper will kill certain fish including trout and bass as well as algae. It is therefore important that all or virtually all of the copper be removed from the alkaline waste solution prior to its discharge into the river, stream or sewer.

Heretofore copper-containing waste solutions have been made sufficiently alkaline, such as by addition of NaOH, to precipitate the copper. No catalyst was employed in this decopperizing. Although the caustic soda addition gives satisfactory results from the standpoint of removing the copper down to a low level, the copper was precipitated as copper oxides, i.e. $Cu_2O$ and $CuO$, and not as metallic copper, viz $Cu°$, which is a readily marketable product. Due to the current demand for metallic copper, it would of course be economically desirable, particularly where material quantities of copper-containing waste solutions are to be decopperized prior to discharge, to recover the copper as the readily marketable zero valent metallic copper.

SUMMARY OF THE INVENTION

In accordance with the present invention, I have found that copper is completely or substantially completely removed from cyanide-free or substantially cyanide-free alkaline waste solutions, for instance substantially cyanide-free chemical reduction alkaline copper plating waste or spent solutions, so as to enable these waste solutions to be safely discharged or discarded into sewers, rivers, or streams without lethal effects to aquatic life. A marketable metallic copper is also recovered by virtue of the invention. The process of the invention which accomplishes this involves contacting the ionic copper in the substantially cyanide-free waste solution also containing a reducing agent for the ionic copper, e.g. formaldehyde, which is added to the solution if not already present therein or present in insufficient amount for reduction of all or virtually all of the ionic copper, and usually also a complexing agent for the ionic copper, with a catalytic material or metal capable of catalyzing the reduction of the ionic copper by the reducing agent to zero valent metallic copper, for example palladium. The catalytic material or metal is added to the waste solution. The catalytic contacting is continued until the desired amount, usually substantially all, of the ionic copper is precipitated as insoluble zero valent metallic copper, and the metallic copper is separated from the thus-treated waste solution, for instance by filtration.

Alkaline copper-containing cyanide-free waste solutions containing a reducing agent and a complexing agent for the ionic copper can be decopperized by the present invention to copper levels below 2 p.p.m. copper and even less than 1 p.p.m. copper (expressed as metallic copper, i.e. $Cu°$). At such low levels of copper, the waste solution can be safely discharged to rivers, streams or sewers without lethal effects to aquatic life.

Any material or metal which is catalytic to the reduction of the ionic copper to zero valent metallic copper by the reducing agent is utilizable herein. Exemplary of such catalytically active material are the precious metals palladium, platinum, gold and silver.

Any alkaline waste solution containing copper and which is free or substantially free of cyanide can be decopperized in accordance with the present invention. Such alkaline waste or spent solutions include, for example, electroless or chemical reduction copper plating solutions, alkaline copper stripper solutions used to strip copper from base metal substrates, and alkaline immersion copper plating solutions. In the alkaline chemical reduction plating waste or spent solutions which are free or substantially free of cyanide, the ionic copper is complexed by a complexing agent other than cyanide, for example EDTA, Rochelle salt, carbonate or other suitable complexing agent. Cyanide may be present in such waste solution in a minute or trace amount in the parts per million range as a stabilizer and the waste solution can be decopperized in accordance with this invention. However, should cyanide be present in the waste solution in much more than trace amounts with significant quantities of copper being complexed by the cyanide in the solution, this invention is not applicable as it will not serve to decopperize the waste solution to an acceptable low level of copper.

The alkaline waste solution can be decopperized herein at room temperature or at elevated temperatures up to about 130° F. The pH of the waste solution is on the alkaline side of pH 7 and usually in the range of 10–13.

A typical alkaline chemical reduction copper plating waste or spent solution will contain residual amounts of copper, of reducing agent for the copper, of complexing agent for the copper, and of an alkali metal hydroxide. Such waste solution may contain about 1 g./l. of copper, about 2 g./l. of the reducing agent such as formaldehyde, about 4 g./l. of the complexing agent such as Rochelle salts, and about 8 g./l. of total hydroxide (g./l. herein means gram or grams per liter).

A typical alkaline waste or exhausted solution resulting from use of an alkaline, non-cyanide copper stripper solution composed of an aqueous solution of ammonium persulfate and ammonium carbonate, for stripping copper from a basis metal surface will contain the stripped copper ions at least a portion of which are complexed in a copper-ammonium complex, and residual amounts of the ammonium persulfate and ammonium carbonate.

A typical alkaline copper immersion plating waste or spent solution will contain ionic copper, a complexing agent such as Rochelle salt, EDTA or ammonia, and caustic soda. Ammonia may also perform the function of pH control.

The reducing agent should be present in the alkaline waste solution to be decopperized in at least an amount sufficient to effect reduction of all divalent ionic copper to zero valent copper metal. Thus the preferred formaldehyde is present in the chemical reduction copper plating waste or spent solution to be decopperized in at least the stoichiometric amount required for reduction of all divalent copper ions to zero valent metallic copper in accordance with the equation set forth hereafter, and preferably in an about 10–50% excess over the stoichiometric amount. The equation for the catalytic reduction of the ionic copper by formaldehyde in a chemical reduction copper plating waste or spent solution is:

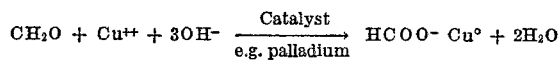

$$CH_2O + Cu^{++} + 3OH^- \xrightarrow[\text{e.g. palladium}]{\text{Catalyst}} HCOO^- \; Cu^\circ + 2H_2O$$

If not already present in the alkaline waste solution in such amount, the reducing agent, for instance formaldehyde, is added to the waste solution to be decopperized, prior to the catalytic contacting, to provide the stoichiometric amount or excess over this amount of such reactant.

Caustic alkali, i.e. sodium hydroxide or potassium hydroxide, may be added with advantageous results to the chemical reduction copper plating waste solution. The amount of caustic alkali added is an amount sufficient to provide an excess of hydroxyl ions in the waste solution over the theoretical or stoichiometric amount required in accordance with the equation hereinbefore set forth. The amount of caustic alkali added will usually be an amount such that the pH of the solution will be maintained in the range 10–13, preferably 11.5–12.5. The caustic alkali, i.e. sodium hydroxide or potassium hydroxide, can be added alone in aqueous solution or solid form, or in combination with the formaldehyde, each in the amounts previously disclosed herein.

The catalyst of this invention can be unsupported or supported on a solid catalyst carrier, for example carbon, alumina, kieselguhr or silica. The unsupported catalyst metal can either be formed in situ in the waste solution when containing a reducing agent capable of reducing a reducible compound of the metal to the catalytic metal, or added as such, i.e. as the catalytic metal, to the waste solution. Excellent results were attained when an aqueous solution of a water soluble palladium salt such as palladium chloride was added to the copper-containing alkaline waste solution also containing a reducing agent such as formaldehyde, and the ionic palladium reduced in situ to zero valent catalytic palladium metal by the reducing agent. Supported catalysts when employed herein, for example supported precious metal catalysts, e.g. supported platinum group metal catalysts such as, for example, supported palladium and platinum catalysts, and supported gold and silver catalysts, are readily obtainable in commerce. The support or carrier for the catalytic metal may be in the form of spheres, granules, extrudates or other suitable shapes. The catalytic metal will usually be present in the supported catalyst in amount, by weight, from about 0.1%–5%, based on total supported catalyst. One source of supported catalyst herein is Engelhard Minerals and Chemicals Corp., 113 Astor St., Newark, N.J.

Although I do not intend to be bound by theory, it is believed that the mechanism involved in the decoppering of the alkaline waste solutions by the present invention is the catalytic metal catalyzing or "triggering" the reduction of the ionic copper to zero valent metal by the reducing agent. When zero valent copper metal is formed or precipitated, it is believed the decoppering then proceeds by the mechanism of copper metal particles serving as nucleation sites for precipitating more copper metal out of solution, and the precipitated copper, which itself is catalytic to the reduction of the ionic copper to copper metal by the reducing agent, catalyzing the reduction of more divalent copper ions to zero valent metal. The original catalytic metal which is believed to "trigger" the catalytic reduction of the ionic copper as stated may also serve to catalyze the reduction of additional ionic copper to zero valent metal by the reducing agent.

When the preferred palladium halide aqueous solution is added as catalyst to the waste solution to be decopperized, the quantity of palladium incorporated into the waste solution is so small or minute that it is unnecessary to separate the palladium from the decopperized waste or spent solution prior to its discharge to the desired locus, i.e. sewer, river, stream, or another suitable place. Thus the $Pd^{++}$ is added to the waste solution to be decopperized as the palladium chloride aqueous solution in amount in the range of only about 1–50 p.p.m. (calculated as Pd) per liter of the waste solution.

In the case of the supported catalysts, such catalyst may be filtered or otherwise separated from the decopperized waste solution prior to its discharge to the desired locus.

Any reducing agent capable of reducing the ionic copper to zero valent copper by the catalyzed reduction reaction herein is utilizable in this invention. Examplary in addition to the formaldehyde previously disclosed herein, are hypophosphites, e.g. sodium hypophosphite or potassium hypophosphite, borazines, dimethylamine borane, acetaldehyde, propionaldehyde, n-butyraldehyde and iso-butyraldehyde. The aldehyde reducing agents are of the formula

$$R-\overset{H}{\underset{|}{C}}=O$$

wherein R is a hydrogen atom or 1–3 C alkyl. The formaldehyde is usually utilized in an aqueous solution known as Formalin. A material capable of supplying the aldehyde under the reaction conditions is also utilizable herein, for example polymers of formaldehyde, e.g. paraformaldehyde. Such polymers are utilizable especially when elevated temperatures are employed for the catalyzed reduction of the ionic copper.

DESCRIPTION OF THE PREFERRED EMBODIMENTS

The preferred catalytically active material herein is palladium. The palladium is preferably added to the alkaline waste solution to be decopperized in ionic form as an aqueous solution of a water-soluble palladium salt, preferably palladium chloride, and in a minute amount in the range of about 1–50 p.p.m. (calculated as Pd) per liter of the waste solution. Due to the small amount of palladium added it is unnecessary to recover it from the waste solution to the desired locus, i.e. sewer, river, stream or another suitable place.

Formaldehyde is the preferred reducing agent herein, and is conveniently used in an aqueous solution of about 37% formaldehyde concentration obtained in commerce as Formalin.

If not already present in excess, the formaldehyde is preferably added to the chemical reduction copper plating waste solution, prior to the catalytic contacting, to provide an excess of formaldehyde therein over the stoichiometric amount required for reduction of all divalent copper ions in the solution to zero valent metallic copper. In accordance with another preferred embodiment, the formaldehyde can be added in combination with the caustic alkali, preferably sodium hydroxide, to provide the excess of these materials in the chemical reduction copper plating waste solution as hereinbefore disclosed.

The temperature and pH of the waste solutions, in the case of the waste or spent alkaline chemical reduction copper plating solutions at least, is preferably in the range of about 120° F.–130° F. and pH 11–12.5 inclusive for the decopperizing.

The following tests were conducted on the removal of copper from alkaline chemical reduction aqueous copper plating solutions.

A plurality of batches each of 4 liters were prepared of the following chemical reduction copper plating composition:

|  | G./l. |
|---|---|
| $CuSO_4 \cdot 5H_2O$ | 10.0 |
| NaOH | 10.0 |
| Formaldehyde (37% concentration), 10.0 mls./l. | |
| Rochelle salt | 50.0 |

A standard $PdCl_2$ aqueous solution was prepared. The $PdCl_2$ aqueous solution was added in the following amounts to each of the batches of chemical reduction aqueous copper plating solution.

| Batch No.: | Quantity of $Pd^{++}$ added |
|---|---|
| 1 | 1.0 p.p.m. $Pd^{++}$/l. |
| 2 | 2.5 p.p.m. $Pd^{++}$/l. |
| 3 | 5.0 p.p.m. $Pd^{++}$/l. |
| 4 | 7.5 p.p.m. $Pd^{++}$/l. |
| 5 | 10.0 p.p.m. $Pd^{++}$/l. |
| 6 | 25.0 p.p.m. $Pd^{++}$/l. |
| 7 | 50.0 p.p.m. $Pd^{++}$/l. |

The chemical reduction copper plating solution in the seven batches contained the reactants in the correct stoichiometric amounts for reduction of the $Cu^{++}$ therein to insoluble $Cu°$ in accordance with the equation:

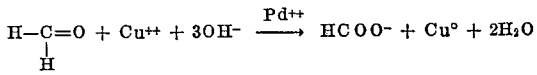

The following results were attained, with the column heading "Approximate Time of Completion of Reaction" meaning the approximate time to reduce virtually all of the $Cu^{++}$ to $Cu°$ in accordance with the equation set forth immediately above.

| Batch No. | P.p.m. $Pd^{++}$ added/l. | Approximate time of completion of reaction (hrs.) |
|---|---|---|
| 1 | 1.0 | 5.0 |
| 2 | 2.5 | 5.0 |
| 3 | 5.0 | 5.0 |
| 4 | 7.5 | 4.5 |
| 5 | 10.0 | 4.5 |
| 6 | 25.0 | 4.0 |
| 7 | 50.0 | 3.5 |

The approximate time of completion of the reaction in each of the above batches and in the batches hereafter referred to was determined by the time to absence of any color in the supernatant liquids, the color caused by the presence of complexed copper.

A plurality of additional batches each of 4 liters were prepared of the alkaline chemical reduction copper plating solution of the composition previously set forth herein. To each batch was added $Pd^{++}$ by means of the standard $PdCl_2$ aqueous solution previously referred to herein. To certain of the baths there was also added formaldehyde and/or sodium hydroxide. The formaldehyde was added as an aqueous solution of 37% concentration, i.e. as Formalin, and the sodium hydroxide added as an aqueous solution of 20% concentration. The amounts of these materials added to each batch follow:

| Batch No.: | Material added |
|---|---|
| 8 | 100 mls. Formalin+100 mls. aqueous NaOH+4 p.p.m. $Pd^{++}$. |
| 9 | 100 mls. Formalin+4 p.p.m. $Pd^{++}$. |
| 10 | 100 mls. aqueous NaOH+4 p.p.m. $Pd^{++}$. |
| 11 | 4 p.p.m. $Pd^{++}$. |
| 12 | 50 mls. Formalin+4 p.p.m. $Pd^{++}$. |

The following results were attained, with the column heading "Approximate Time of Completion of Reaction" meaning the approximate time to reduce virtually all of the $Cu^{++}$ to insoluble $Cu°$ in accordance with the equation hereinbefore disclosed.

| Batch No.: | Approximate time of completion of reaction (hours) |
|---|---|
| 8 | 2 |
| 9 | 2 |
| 10 | 4 |
| 11 | 6 |
| 12 | 2 |

The foregoing results from the tests on Batch Nos. 8–12 show the improvement in the decopperizing achieved by the addition of formaldehyde and caustic soda or formaldehyde alone, in addition to the $Pd^{++}$, from the standpoint of speeding up the reaction rate.

In all of the foregoing test results, the zero valent metallic copper was readily separated from the solution by filtration leaving a water-white solution virtually free of copper and containing less than 2 p.p.m. copper. Such a low level of copper rendered the solution in each case safe for discharge into sewers, rivers, streams, etc. without lethal effects to aquatic life.

While the novel features of the invention have been disclosed herein and are specified in the amended claim, it will be understood that various omissions, substitutions and changes may be made by those skilled in the art without departing from the spirit of the invention.

What is claimed is:

1. A process for the removal of copper from substantially cyanide-free alkaline ionic copper-containing chemical reduction copper plating aqueous waste solutions which comprises:

(a) adding palladium to the substantially cyanide-free alkaline ionic copper-containing chemical reduction copper plating aqueous waste solution also containing a reducing agent for the ionic copper and a complexing agent for the ionic copper and having a temperature in the range of from room temperature to about 130° F. and a pH above 7 thereby contacting the waste solution with the palladium as catalyst, the palladium being added to said waste solution in ionic form as an aqueous solution of palladium chloride and in amount in the range of about 1–50 p.p.m. (calculated as Pd) per liter of the waste solution, and the reducing agent being present in the waste solution in at least an amount sufficient to effect reduction of all divalent ionic copper to zero valent metallic copper;

(b) continuing the contacting of (a) until substantially all of the ionic copper is precipitated from the waste solution as zero valent metallic copper; and the copper content of the waste solution is reduced to less than 1 p.p.m. of copper;

(c) separating the metallic copper from the waste solution; and (d) discharging the de-copperized waste solution containing less than 1 p.p.m. of copper and containing the added palladium to a desired locus.

References Cited
UNITED STATES PATENTS

| | | | |
|---|---|---|---|
| 3,215,524 | 11/1965 | Fetscher et al. | 75—117 X |
| 2,643,199 | 6/1953 | Hersch | 75—117 X |
| 1,426,517 | 8/1922 | Sulzberger | 75—108 UX |
| 3,096,182 | 7/1963 | Berzins | 75—119 UX |
| 3,369,886 | 2/1968 | Metzger et al. | 75—108 X |
| 3,494,760 | 2/1970 | Ginder | 75—108 X |

L. DEWAYNE RUTLEDGE, Primary Examiner

G. T. OZAKI, Assistant Examiner

U.S. Cl. X.R.

75—117

UNITED STATES PATENT OFFICE
CERTIFICATE OF CORRECTION

Patent No. __3,666,447__   Dated __May 30, 1972__

Inventor(s) __Edward B. Saubestre__

It is certified that error appears in the above-identified patent and that said Letters Patent are hereby corrected as shown below:

Column 1, line 43, after "rivers" the following should be inserted --or streams. Due to the high copper content of the --; line 44, the phrase "of chemical reduction copper plating alkaline pent" should be deleted; line 46, "alkalie" should read --alkaline-- Column 3, line 44, --+-- should be inserted after "HCOO-" and before "Cu°". Column 4, line 62, a hyphen should be inserted after "form". Column 5, line 7, after "solution" and before "to" the following should be inserted --after decopperizing and before discharge of the waste solution--.

Signed and sealed this 19th day of December 1972.

(SEAL)
Attest:

EDWARD M. FLETCHER, JR.
Attesting Officer

ROBERT GOTTSCHALK
Commissioner of Patents